Patented Aug. 26, 1952

2,608,584

UNITED STATES PATENT OFFICE 2,608,584

PREPARATION OF N-ALKYL ARYLAMINES

Francis J. Sprules, Arlington, and John B. Bell, Jr., Locust, N. J., assignors to Nopco Chemical Company, Harrison, N. J., a corporation of New Jersey No Drawing. Application March 19, 1947, Serial No. 735,806

11 Claims. (Cl. 260—570.9)

The present invention relates to a process for preparing benzyl type amines and more particularly to the preparation of N,N-dimethyl benzylamine.

Dimethyl benzylamine and similar benzylamines show promise of great utility as intermediates in the manufacture of bactericidal compositions. In the past dimethyl benzylamine has been formed from benzyl chloride and dimethylamine by reacting them under anhydrous conditions at high temperatures usually accompanied by elevated pressures. In concentrating the desired reaction product, it was common to distill the dimethyl benzylamine off from the reaction mixture. This distillate was usually contaminated with quaternary compounds and to some extent with dimethylamine and various amine hydrochlorides formed during the reaction.

An object of the invention is to provide an improved method for preparing benzyl type amines.

A second object of the invention is to provide a simpler and more economical method for preparing benzyl type amines.

A third object of the invention is to provide an improved process for the production of N,N-dimethyl benzylamine.

Other objects of the invention will in part be obvious and will in part appear hereinafter.

The subject matter of this invention concerns the production of benzyl type amines by the reaction at temperatures of the order of 5 to 50° C. of an aralkyl halide with an aqueous solution of ammonia or a primary or secondary amine containing 1 to 4 carbon atoms in each alkyl group. The expression "benzyl type amine" is used herein to denote not only amines containing the benzyl radical but also those having a substituted benzyl group and benzyl radical homologs such as p-chlorobenzyl, menaphthyl (naphthyl methyl) and similar aralkyl groups. Other novel features include the employment of steam distillation in isolating the benzyl type amine in substantially pure form from other components of the reaction mixture and the reuse of the excess ammonia or amine in successive reactions of the same type.

The invention accordingly comprises the several steps and the relation of one or more of such steps with respect to each of the others thereof, which will be exemplified in the process hereinafter disclosed, and the scope of the invention will be indicated in the claims.

The new method of forming benzyl type amines possesses numerous advantages over the processes of the prior art. Ammonia, dimethylamine and like substances which are gases at room temperature are handled more conveniently and safely in the form of solutions in water. Heating of the reaction mixture is seldom if ever required, and this constitutes a distinct economy. Moreover, the improved process renders the use of high pressures unnecessary; hence it may be carried out with greater ease in simpler and less costly apparatus. It has also been discovered that first separating and then steam distilling the layer of the reaction products containing the desired benzyl type amine permits this amine to be recovered in a substantially pure state.

In its broadest form, the invention concerns the replacement of the halogen atom of an aralkyl halide by an amino group as denoted by the equation:

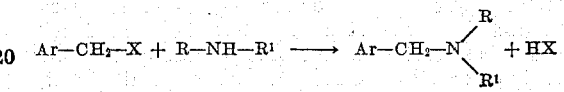

where Ar stands for a phenyl or naphthyl radical, either unsubstituted or substituted; X represents a halogen atom, and R and $R^1$ each is a hydrogen atom or alkyl radical containing from 1 to 4 carbon atoms.

The aralkyl halide may contain an unmodified benzyl or α- or β-menaphthyl group or one with any of its ring or methylene hydrogen atoms replaced by aromatic, lower alkyl, alkoxy, halogen, nitro, etc. radicals. In view of its activity and low cost, the preferred halide is the chloride. A few of the many specific examples which may be named are benzyl chloride, α- and β-menaphthyl chloride, o-phenyl benzyl chloride, p-chlorobenzyl chloride, p-methyl benzyl chloride and their corresponding bromides, etc.

The amino group of the benzyl type amine may be supplied by an aqueous solution of ammonia or a primary or a secondary aliphatic amine. Where an amine is employed, each alkyl radical may contain from 1 to 4 carbon atoms in either straight or branched chains. The secondary amines can be either symmetrical or unsymmetrical. Suitable amines include, inter alia, methyl amine, ethyl amine, propyl amine, butyl amine, dimethyl amine, diethyl amine, di-n-propyl amine, di-isopropyl amine, di-n-butyl amine, di-sec butyl amine, di-tert butyl amine and di-isobutyl amine. It is, of course, to be understood that the aralkyl halide and the amine-forming reactant may be introduced as pure compounds, mixtures of various halides, mixtures of various nitrogen compounds and commercial or technical grades thereof.

Since many of the benzyl type amines will react further with aralkyl halides to form other amines and quaternary salts, the reaction mixture should contain a large excess of the nitrogen-containing reactant in order to improve the yield of the desired product and minimize the formation of by-products. It was determined that the use of at least 4 moles of a dialkyl amine for each mole of aralkyl halide provided excellent yields and reduced quaternary salt formation considerably, especially in the layer of the reaction mass containing the main portion of the product. As a general rule it may be stated that a minimum of 4 moles of an alkyl amine or 15 moles of ammonia should be employed for each mole of the aralkyl halide. It should be borne in mind that the large excess of the nitrogenous substance is not lost, for this material may be recovered from the reaction mixture. This is best accomplished by using the residue of the initial reaction mass for the next batch after merely making up the amounts of reactants actually expended in the initial reaction as described hereinbelow. The amine or ammonia is preferably employed in the most concentrated aqueous solution available in order to minimize the quantity of materials to be handled. Moreover, the reaction conditions are such that losses due to evaporation of the nitrogen compound are not large.

The simple reaction conditions constitute a great advance over the prior art. While reduced or elevated pressures may be employed in the present process, this practice is unnecessary, undesirable and expensive in performing an operation which can be carried out at atmospheric pressure.

The preferred reaction temperatures are between 5 and 50° C., for ice and extremely slow reactions are encountered below the lower limit, and excessive losses of amine or ammonia occur at temperatures above the upper limit unless costly and troublesome pressure equipment is used. It appears that the optimum reaction temperatures are in the range from 30 to 40° C. While laboratory experience indicates that it is desirable to control the temperature entirely by the rate of introducing the aralkyl halide into the nitrogen compound, it is recommended that commercial-scale reaction vessels be provided with means for such heating or cooling as may be desirable. Despite the fact that the reactants are not refluxed, a reflux condenser should be utilized to reduce the losses of ammonia or volatile amines, as many of these compounds have boiling points below 20° C.

To preserve the advantages accruing from the excess of nitrogen compound, the aralkyl halide should be added with constant stirring to the amine or ammonia at a rate such that there is substantially no unreacted aromatic substance in the reaction field. The agitation should be maintained for the duration of the chemical action to provide sufficient mixing of the reactants for best results, because the mass is not stirred by ebullition and aralkyl halides in general are immiscible with water. In the laboratory, periods of 1 to 2 hours were required to accomplish this and also maintain a proper temperature in this exothermic reaction. Although the reaction usually appeared substantially complete by the time all of the aralkyl halide had been added, the agitation was continued for an additional period of 1 to 6 hours to insure this result.

Numerous advantages are derived from the aqueous reaction medium. Concentrated solutions of the gaseous nitrogen compounds can be handled far more safely, easily and economically than can the gases themselves. Moreover, the reaction products split into two layers with the by-products concentrated chiefly in the aqueous phase while the major portion of the desired benzyl type amine is in the oily layer. Chilling the reaction products is useful in promoting separation of the liquid into layers, and temperatures of the order of 5° C. are excellent for the purpose. Moreover, this treatment tends to precipitate the product out of the aqueous phase into the layer containing the major portion of the benzyl type amine. Thus it is a simple matter to concentrate the preferred product by merely removing the oily product layer from the aqueous matter in separatory apparatus of known design.

While the product may be concentrated by distilling the layer containing it, this will not separate it from any appreciable amounts of quaternary salts present in the product layer. It has been discovered that the benzyl type amine may be isolated from any quantity of quaternary compounds in the layer by steam distillation, as the quaternary salts are not volatilized in this operation. Whenever either steam or atmospheric distillation is employed, a purer product may be obtained by not mixing the first and most volatile fraction which contains all of the small amount of nitrogen-containing reactant found in the product layer with the principal fraction comprising the desired amine.

The steam distillate contains a large quantity of water in which the benzyl type amine is slightly soluble; hence it is desirable to saturate the distillate with salt to reduce the amount of the product in aqueous solution. A volatile, substantially water-immiscible solvent for the particular benzyl type amine may then be agitated with the steam distillate to extract the desired product, and repetition of the extraction is desirable. Suitable extracting agents include, inter alia, ethyl ether, benzene, petroleum ether, ethylene dichloride and the like. The expression "substantially water-immiscible" is used herein to denote liquids which are not soluble in water to an extent greatly exceeding the solubility of ethyl ether in water. In addition, the extractant should be considerably more volatile than the extracted product to avoid loss of the latter while evaporating the extracting solvent.

For maximum efficiency the aqueous phase of the reaction mixtures should be reused. As many as eighteen successive reactions have been carried out by simply adding to this aqueous residue a quantity of the nitrogenous reactant sufficient to bring the amount of free amine or ammonia up to its original value. Then the reaction is repeated by the introduction of the same quantity of aralkyl halide as before. An important advantage usually derived from this method is a considerable increase in yield of the benzyl type amine over the original yield. This is attributed to the fact that the aqueous layer is already substantially saturated with the slightly water-soluble benzyl type amine, and hence will dissolve little or no more of this substance. The nitrogen-containing reactant may be easily recovered from the final aqueous phase of reaction products by conventional methods.

The hydrochloric acid liberated in the reaction reacts in turn with ammonia, amines and reaction by-products to form ammonium chloride, amine hydrochlorides and quaternary salts, respectively. These may be decomposed by the addition of an equimolecular quantity of any alkaline substance except ammonia compounds. As a result of this decomposition, the ammonia or amine reactant is released, and the make up requirements correspondingly reduced to about 1.1 moles per mole of aralkyl halide added in the succeeding reaction. Examples of suitable alkaline compounds include the hydroxides and various carbonates of potassium and sodium. However, when many successive reactions are being performed, it is preferred to eliminate formation of alkali salts in the aqueous layer being reused by omitting the alkaline treatment in this instance.

For a fuller understanding of the nature and objects of the invention, reference should be had to the following examples which merely illustrate the invention and are not to be construed in a limiting sense. All proportions are expressed in terms of weight unless otherwise stated.

EXAMPLE I

*Preparation of benzylamine*

| | Grams |
|---|---|
| Concentrated NH₄OH (28% NH₃ content) | 810.0 |
| Benzyl chloride | 84.3 |
| Aqueous sodium hydroxide solution (49% NaOH) | 52.3 |
| Ethyl ether | 200.0 |
| Sodium chloride | |

A three-necked flask was equipped with a reflux condenser dropping funnel and an agitator. All of the aqueous ammonium hydroxide solution was poured into the flask; then the benzyl chloride was introduced drop by drop over a period of two hours with constant stirring of the mixture. The exothermic heat of reaction kept the temperature between 30 and 34° C. during this period. When it is desired to introduce the benzyl chloride at a faster rate, conventional cooling means can be employed to control the temperature. A large excess of ammonia was employed as the molar ratio of reactants was 20 to 1. An additional two hours was allowed to insure completion of the following reaction:

$$C_6H_5CH_2Cl + 2NH_3 \rightarrow C_6H_5CH_2NH_2 + NH_4Cl$$
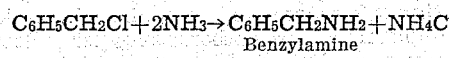
Benzylamine Then the equimolecular quantity of caustic soda solution was added. When quiescent, the mixture split into an aqueous layer and an oily layer. After separating these two layers by use of a separatory funnel, the aqueous phase was made available for further repeated use by merely adding sufficient ammonium hydroxide to bring the total quantity of ammonia up to the original figure. The oily layer was steam distilled until no further oily constituent was visible in the condensed distillate as it dripped down the condenser tube. This distillate was saturated with sodium chloride and successively extracted with an initial 80 and three 40 gram batches of ethyl ether. Upon evaporation of the ether from the extract, 52.0 grams of crude benzylamine remain which was distilled at atmospheric pressure. 41.0 grams of substantially pure benzylamine distilled over in the boiling range 185–192° C., while the residue was found to contain an additional 2.3 grams of benzylamine and 8.7 grams of other matter which was believed to consist entirely of dibenzyl amine. Thus the total yield of benzylamine was 43.3 grams or 60.7% based on the weight of benzyl chloride.

EXAMPLE II

*Preparation of methyl benzylamine*

| | | |
|---|---|---|
| Aqueous methylamine solution (25%) | gram-moles | 6 |
| Benzyl chloride | do | 1 |
| Aqueous NaOH solution (50% NaOH) | gram-moles | 1 |
| Ethyl ether | grams | 200 |
| Sodium chloride | | |

The procedure of Example I was repeated using the above materials. The reaction here took the course:

$$C_6H_5CH_2Cl + 2CH_3NH_2 \rightarrow$$
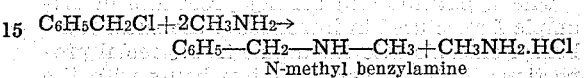
N-methyl benzylamine

Monomethyl benzylamine was obtained in 75% yield and with a boiling point of 82° C./27 mm. mercury (absolute).

EXAMPLE III

*Preparation of dimethyl benzylamine*

| | Grams |
|---|---|
| Aqueous dimethyl amine (25% concentration) | 1088.0 |
| Benzyl chloride | 126.6 |

In the apparatus of Example I, the benzyl chloride was added dropwise over a two-hour period to the amine (molar ratio 1 to 6) at a rate sufficient to maintain the temperature below 40° C. Stirring was continued at room temperature for an additional hour to insure completion of the reaction denoted by the equation below.

$$C_6H_5CH_2Cl + 2(CH_3)_2NH \rightarrow$$
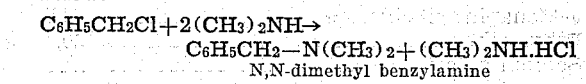
N,N-dimethyl benzylamine

Thereafter the reaction mixture was cooled in a separatory funnel while standing in a refrigerator maintained at 5° C. and separated into two layers. The upper oily layer, weighing 111.5 grams, was removed and steam distilled until no further oleaginous component was observed in the distillate as it came over. The crude distillate was found to contain 103.5 grams of N,N-dimethyl benzylamine (76.1% of theory), 3.3 grams of dimethyl amine and no quaternary salts. The dimethyl amine was distilled off below 29° C. under atmospheric pressure from the dimethyl benzylamine (B. P. 82° C./18 mm.).

EXAMPLE IV

*Preparation of dimethyl benzylamine*

| | Grams |
|---|---|
| Lower aqueous phase of Example III | 1103.0 |
| Sodium chloride | |
| Aqueous KOH solution (28.3% KOH) | 200.0 |
| Aqueous dimethylamine (25% concentration) | 198.0 |
| Benzyl chloride | 126.5 |

The lower layer of the reaction mixture of the first run (Example III) containing dimethyl amine, dimethyl benzylamine, amine hydrochlorides, dibenzyl dimethyl ammonium chloride and water was reused after being transferred to a 3-necked flask containing a sodium chloride-ice mixture. This mixture prevented any excessive heating as the caustic potash solution was added to release the amines from their hydrochloride salts. The molar ratio of added dimethyl amine to benzyl chloride was only 1.1 to 1 in this instance, and the reaction was thereupon carried out in the same manner as Example III. The oily layer weighed 131.0 grams and was found to contain 122.5 grams of dimethyl benzylamine (91% of the theoretical yield) and 3.2 grams of dimethyl amine. It will be noted that the yield here was substantially greater than in Example III.

EXAMPLE V

*Preparation of p-methyl benzyl dimethyl amine*

| | Grams |
|---|---|
| Aqueous dimethyl amine (25%) | 155.0 |
| p-Methyl benzyl chloride | 20.1 |
| Ethyl ether | 160.0 |

The apparatus and mixing procedure of Example I were used in introducing the substituted benzyl chloride into the amine in 1:6 molal proportions during a period of two hours with the temperature rising to 34° C. As before, an extra two hours was allowed for completion of the action; then the liquid reaction mass was chilled to 5° C. overnight. The two layers which formed were separated and the upper one steam distilled. The distillate was extracted three times with 80, 40 and 40 gram portions of ether, respectively. After drying the combined extracts over sodium sulfate, the ether was evaporated to yield 18.0 grams (84% of theory) of a water-white residue of p-methyl benzyl dimethyl amine having a neutral equivalent of 155 (theory 149).

EXAMPLE VI

*Preparation of α-menaphthyl ethyl amine*

| | Grams |
|---|---|
| Aqueous ethyl amine solution (70% amine) | 15.0 |
| α-Menaphthyl chloride | 6.7 |
| Ethyl ether | 120.0 |
| Sodium chloride | ---- |

Using a molar ratio of reactants of about 6 to 1, the reaction was carried out similarly to that of Example I.

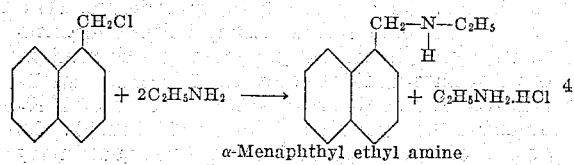

α-Menaphthyl ethyl amine

The total reaction time was 8 hours, and the temperature was maintained at less than 40° C. After cooling to 5° C. overnight, the lower of the two layers was drawn off and steam distilled to isolate the desired product from various by-products. Next the water in the resulting distillate was saturated with sodium chloride to reduce the solubility of the α-menaphthyl ethyl amine (α-naphthyl methyl ethyl amine) in the aqueous phase before extracting the product with 60, 30 and 30 gram portions of ether. By evaporating the ether, a recovery of 77.5% or 5.5 grams was effected, and no drying was found necessary. The neutral equivalent of 189 of the product established its comparatively high purity when compared with the theoretical figure of 185 for the compound in question.

EXAMPLE VII

*Preparation of p-chlorobenzyl dimethyl amine*

| | Grams |
|---|---|
| Aqueous dimethyl amine solution (25%) | 180.2 |
| p-Chlorobenzyl chloride | 27.0 |
| Aqueous NaOH solution (49% NaOH) | 13.5 |
| Ethyl ether | 310.0 |
| Sodium chloride | ---- |

The amine and aralkyl chloride in 6:1 molal ratio were reacted in the same fashion as in Example I over a total period of four hours with the reaction temperature reaching a maximum of 35° C. Thereafter the caustic soda solution was added and the mixture thoroughly shaken. When agitation was stopped, the mass divided into two layers and they were separated in conventional manner without cooling. Although the product was concentrated in the lower layer, the upper layer was extracted three times with a total of 150 grams of ether. These three extracts were added to the lower layer and the ether removed by evaporation. Then the lower layer was steam distilled until no further oily liquid was observed in the distillate as it condensed. The distillate was first saturated with sodium chloride, and then extracted with 80, 40 and 40 gram batches respectively, of fresh ether. After drying the combined extracts over sodium sulfate, the ether was distilled off leaving 27.7 grams, corresponding to a 97.5% yield, of colorless p-chlorobenzyl dimethyl amine with a neutral equivalent of 163 (theory 170).

Since certain changes may be made in carrying out the above method without departing from the scope of the invention, it is intended that all matter contained in the above description shall be interpreted as illustrative and not in a limiting sense.

It is also to be understood that the following claims are intended to cover all the generic and specific features of the invention herein described, and all statements of the scope of the invention, which as a matter of language might be said to fall therebetween.

Having described our invention, what we claim as new and desire to secure by Letters Patent is:

1. A method for producing a benzyl type amine which comprises admixing with continual stirring at a temperature of 5 to 50 degrees centigrade and at approximately atmospheric pressure an aralkyl halide selected from the group consisting of benzyl, halides, menaphthyl halides and the alkyl, phenyl and halogen substituted benzyl and menaphthyl halides with an aqueous solution of a nitrogen compound selected from the group consisting of ammonia, primary aliphatic amines containing from 1 to 4 carbon atoms per molecule and secondary aliphatic amines containing from 1 to 4 carbon atoms in each alkyl radical, thereby forming a benzyl type amine, the molar ratio of the nitrogen compound to the aralkyl halide being at least about 4 to 1.

2. The method of claim 1 and the step of steam distilling a portion of the resulting reaction products.

3. The method of claim 1 in which the boiling point of the nitrogen compound is less than 20 degrees centigrade at atmospheric pressure.

4. The method of claim 1 and the steps which comprise separating the liquid layer containing the major portion of the benzyl type amine from the reaction mixture, steam distilling said liquid layer, extracting the resulting distillate with a volatile water-immiscible solvent for the benzyl type amine, and evaporating the solvent from the solvent extract to concentrate the benzyl type amine.

5. The method of claim 1 and the steps of removing the layer of the reaction mixture containing the major portion of the benzyl type amine, and repeating the reaction at 5 to 50 degrees centigrade and at approximately atmospheric pressure by adding additional quantities of the reactants to the remainder of the reaction mixture.

6. The method of claim 1 and the steps of removing the layer containing the major portion of the benzyl type amine from the remainder of the reaction mixture, adding a non-nitrogenous alkaline substance to the remainder of the reaction mixture to decompose a hydrohalide salt therein, and repeating the reaction at 5 to 50 degrees centigrade and at approximately atmospheric pressure by adding additional quantities of the aralkyl halide and the aqueous solution of a nitrogen compound to the remainder of the reaction mixture.

7. A method for producing a dialkyl benzylamine which comprises admixing with continual stirring at a temperature of from 5 to 50 degrees centigrade and at approximately atmospheric pressure a benzyl halide with an aqueous solution of a secondary aliphatic amine containing 1 to 2 carbon atoms in each alkyl radical to form a dialkyl benzylamine, the molar ratio of the aliphatic amine to the benzyl halide being at least about 4 to 1.

8. A method for producing dimethyl benzylamine which comprises admixing with continual stirring benzyl chloride with an aqueous solution of dimethyl amine at a temperature of from 5 to 50 degrees centigrade and at approximately atmospheric pressure to form N,N-dimethyl benzylamine, the molar ratio of the dimethyl amine to the benzyl chloride being at least about 4 to 1.

9. The method of claim 8 and the steps which comprise removing the upper liquid layer from the remainder of the reaction mixture, and steam distilling said layer to remove the dimethyl benzylamine therefrom.

10. A method for producing dimethyl benzylamine which comprises admixing with continual stirring one mole of benzyl chloride with an aqueous solution containing at least 4 moles of dimethyl amine at a temperature of 5 to 50 degrees centigrade and at approximately atmospheric pressure to form N,N-dimethyl benzylamine, removing the upper liquid layer containing the major portion of dimethyl benzylamine from the remainder of the reaction mixture, steam distilling the dimethyl benzylamine out of said layer, extracting the resulting distillate with a volatile substantially water-immiscible solvent for N,N-dimethyl benzylamine, separating the solvent extract from the distillate, and evaporating the solvent from the solvent extract to concentrate the dimethyl benzylamine.

11. A method for producing dimethyl benzylamine which comprises admixing with continual stirring 1 mole of benzyl chloride with an aqueous solution of at least 4 moles of dimethyl amine at a temperature of from 5 to 50 degrees centigrade and at approximately atmospheric pressure to form N,N-dimethyl benzylamine separating the upper liquid layer of the reaction mixture which contains the major portion of the dimethyl benzylamine, adding a sufficient quantity of a non-nitrogenous alkaline substance to the lower layer of the reaction mixture to decompose amine hydrochlorides, repeating the reaction at 5 to 50 degrees centigrade and at approximately atmospheric pressure by adding 1 additional mole of benzyl chloride and at least 1.1 additional moles of dimethyl amine to said lower layer, separating the upper liquid layer of the second reaction mixture, and steam distilling said upper layers to remove the N,N-dimethyl benzylamine therefrom.

FRANCIS J. SPRULES.
JOHN B. BELL, Jr.

REFERENCES CITED

The following references are of record in the file of this patent:

UNITED STATES PATENTS

| Number | Name | Date |
|---|---|---|
| 1,854,553 | Livingstone | Apr. 19, 1932 |
| 2,113,640 | Barbieri et al. | Apr. 12, 1938 |
| 2,196,261 | Howland et al. | Apr. 9, 1940 |
| 2,362,579 | Murray et al. | Nov. 14, 1944 |